J. W. PATTERSON & J. A. WEBSTER.
COIN OPERATED VENDING MACHINE.
APPLICATION FILED NOV. 27, 1911.
1,186,030.
Patented June 6, 1916.
3 SHEETS—SHEET 3.
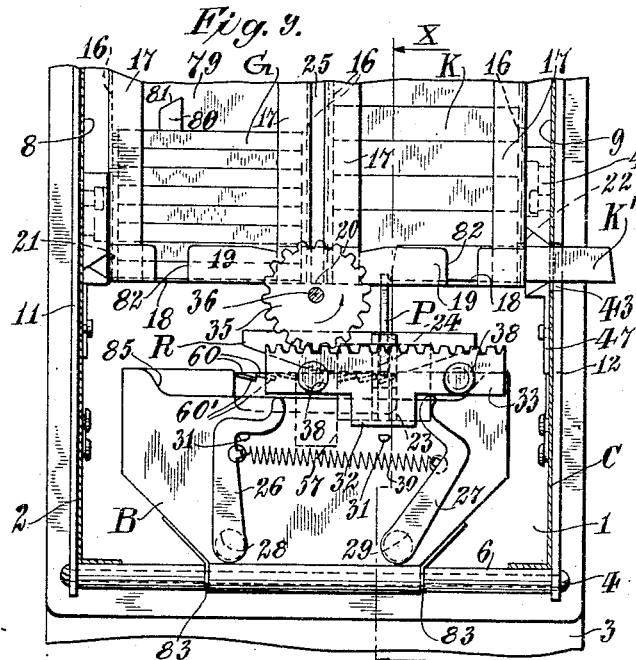
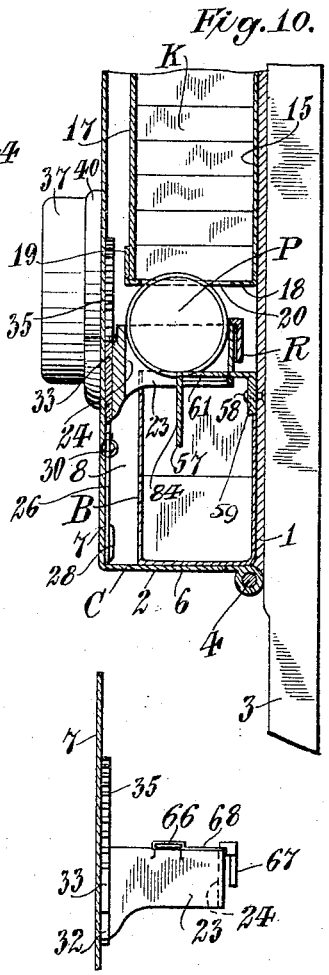
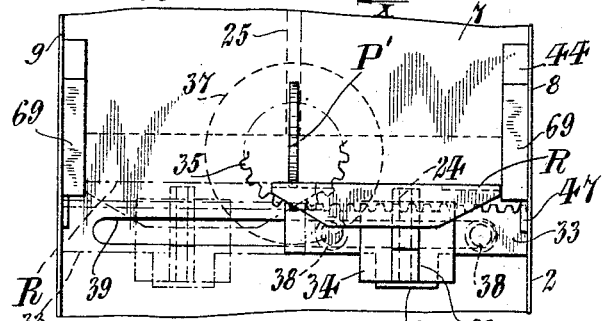
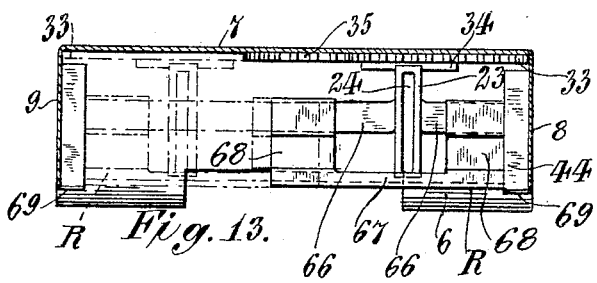
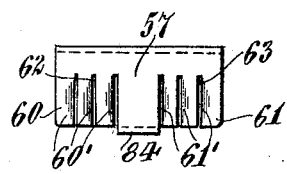
Witnesses:
Inventors:
John A. Webster
James W. Patterson
By their Attorney

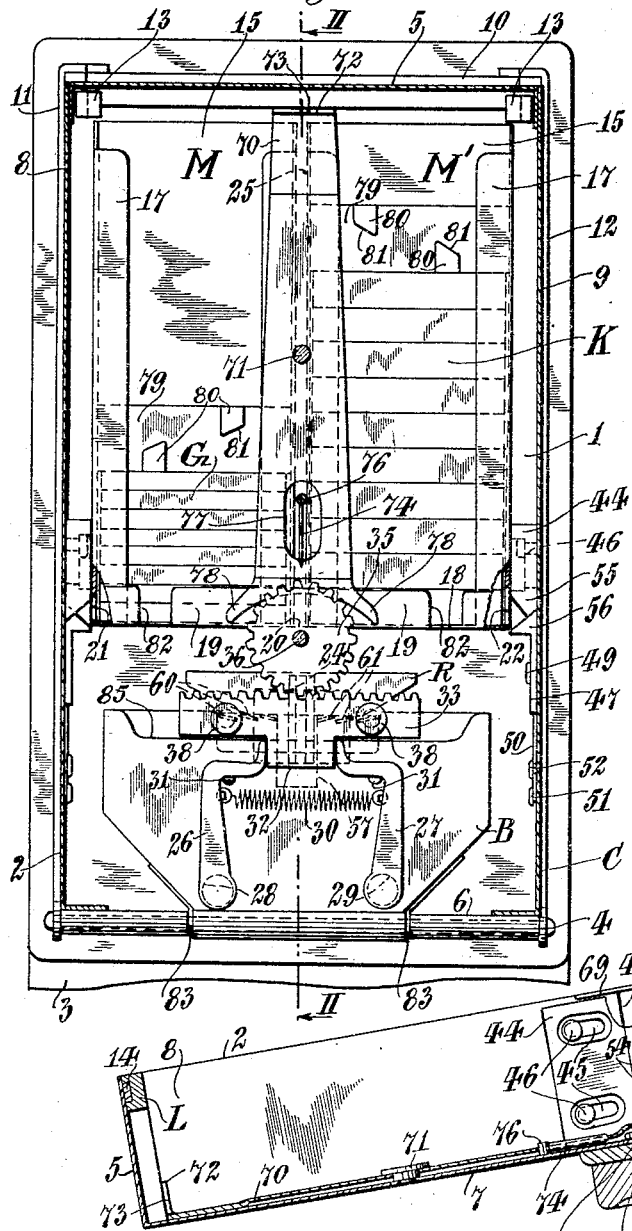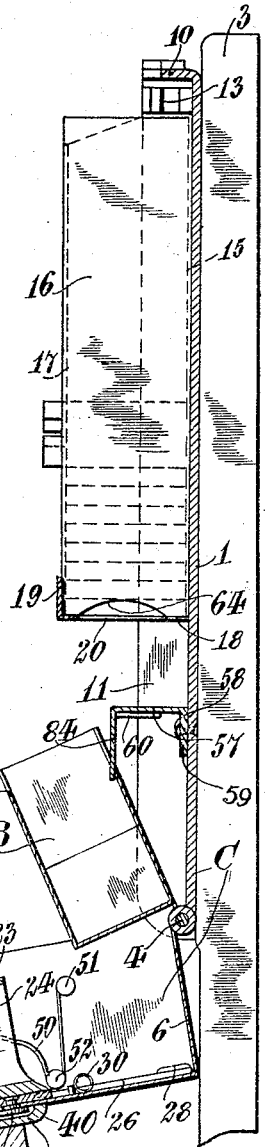

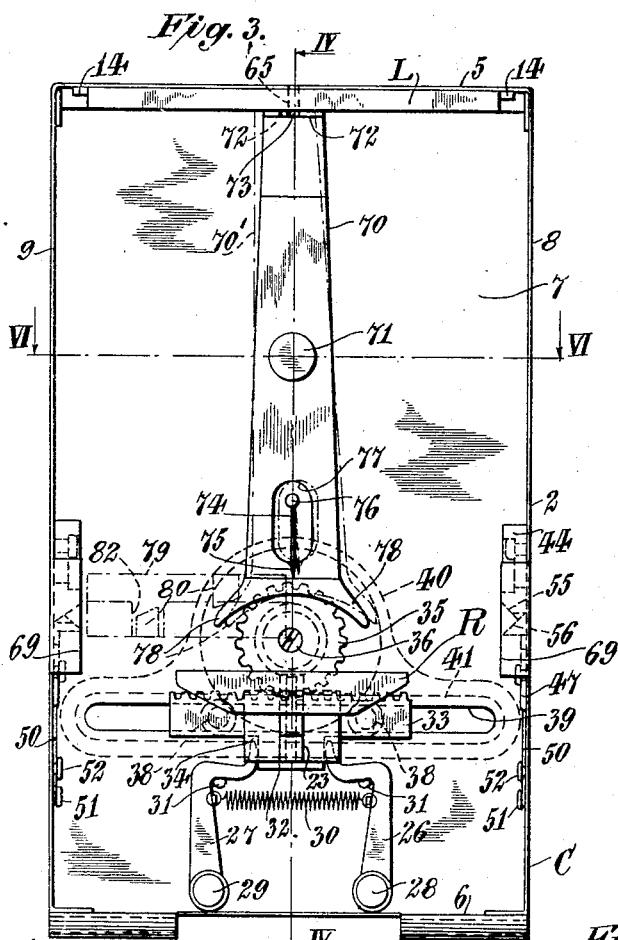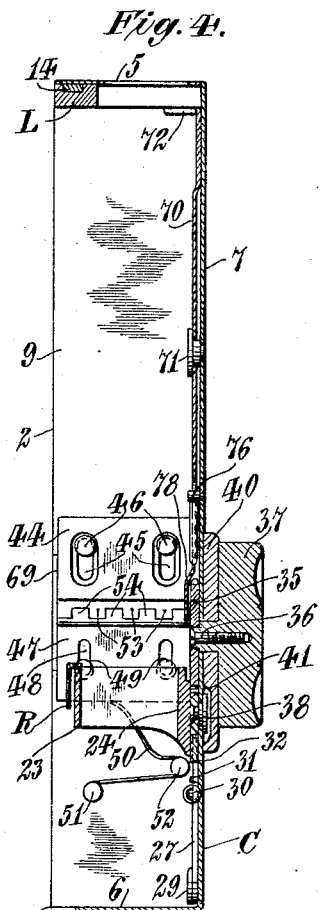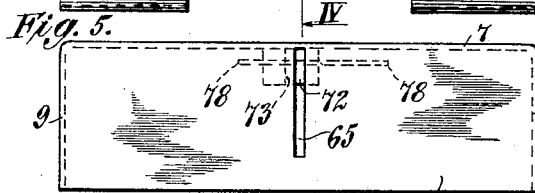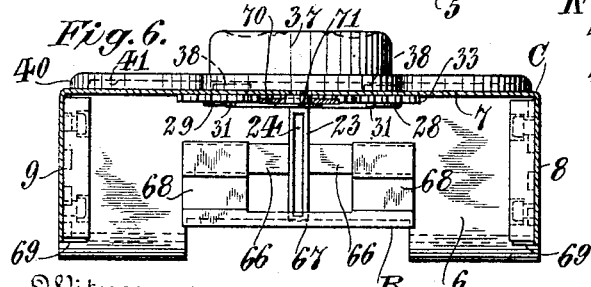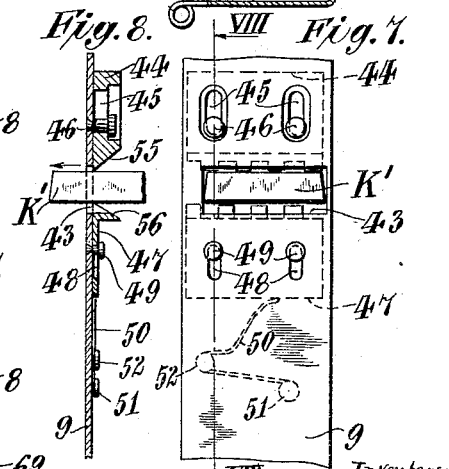

UNITED STATES PATENT OFFICE.

JAMES W. PATTERSON, OF NEW YORK, N. Y., AND JOHN A. WEBSTER, OF WEST HOBOKEN, NEW JERSEY, ASSIGNORS TO AUTOSALES GUM AND CHOCOLATE COMPANY, A CORPORATION OF NEW YORK.

COIN-OPERATED VENDING-MACHINE.

1,186,030.  Specification of Letters Patent.  Patented June 6, 1916.

Application filed November 27, 1911. Serial No. 662,644.

*To all whom it may concern:*

Be it known that we, JAMES W. PATTERSON, a citizen of the United States, residing in New York, county of New York, and State of New York, and JOHN A. WEBSTER, a citizen of the United States, residing in West Hoboken, county of Hudson, and State of New Jersey, have invented a new and useful Improvement in Coin-Operated Vending-Machines, of which the following is a specification.

This invention relates to vending machines of the type adapted to be operated upon the insertion of a coin for vending a suitable commodity, such as chewing-gum, candy or the like.

The machine of our invention is what is known as a continuous-action machine, and embodies various features of novelty over machines of this class heretofore constructed.

The purpose of our invention is to provide a continuous-action or magazine vending machine in which the operative parts are arranged so compactly as to be housed within a casing of small dimensions, so as to be adapted for use in theaters. The first requisite of a theater vending machine is that it be of such small proportions so that it will not obstruct the passageway between the two rows of theater chairs. In the so-called single-action theater machine, of which the prior art shows many embodiments, the coin-controlled mechanism merely unlocks the lids of the machine, but in theater magazine machines arises the necessity of a movable ejecting mechanism which must be housed within a small space and yet be reliable in its operation. The theater magazine machines, or "penny theater machines", as they are commonly called, command a field of usefulness for which the single-action machines are wholly unfitted. In the first place, the single-action machines require the deposition of either a nickel or a dime and contain only one or two packages. On the other hand, the penny theater machines are designed to operate with a one-cent piece for which they deliver a small piece of chocolate or chewing-gum or other confection, and may be operated repeatedly until the magazines are empty. So that, whereas a single-action machine must be replenished after every operation, a penny machine works continuously until exhausted, and lasts over a considerable period without the necessity of replenishing.

The construction and arrangement of the various mechanisms of our new machine permit of a casing of minimum dimensions with a maximum capacity, without sacrificing or impairing the certainty of operation of the machine.

More specifically considered, one object of our invention is to provide a vending machine having two magazines for holding the vendible commodities, and having a common coin-carrier arranged beneath the magazines and normally held in a position to receive the deposited coin, the carrier being movable transversely of the machine in either direction from its normal position to cause ejection of the lower-most package in either magazine. In the preferred form of our invention the operative connection between the coin-carrier and the knob or handle on the outside of the machine, is a rack-and-pinion connection, which is exceedingly simple in construction and operation.

Another object of our invention is to provide a vending machine having a lateral delivery,—that is to say, the commodity ejected from the magazines by the ejecting mechanism is delivered to the patron through delivery-openings arranged in the side walls of the casing. One or both of the side walls may be provided with a delivery-opening, according as the machine has one or two magazines. This lateral delivery feature conduces to the compactness of the machine, for it obviates the necessity of a separate delivery-chute. Furthermore, the operation of the ejecting mechanism and the arrangement of the magazine with respect to the delivery-opening, are such that the ejected package is retained partly within the magazine and partly projecting out of the casing after action of the ejecting mechanism on the package, so that the package does not fall to the floor but remains partly exposed in the casing until removed by the purchaser.

Another object of our invention is to provide a vending machine having means to hold a deposited coin at the bottom of the coin chute when the carrier is out of normal position, and yet permit the coin to drop into operative position as soon as the carrier reaches its normal position.

A further object of our invention is to so construct the machine that the interior mechanism may be readily exposed for inspection or repair, and the magazines replenished with facility. To this end, we have provided a casing consisting of a box-like section and a flat section separably connected together. The flat section carries the magazine or magazines and the coin-chute, while the box-like section supports the coin-controlled ejecting mechanism. When two magazines are used, the adjacent side walls are so spaced as to form the coin-chute between them, which does away with the necessity of a separate coin-chute. Where only one magazine is used, the coin-chute is formed by one wall of the magazine and a third wall secured to the flat section closely adjacent to the magazine. The box-like section is also provided with the coin-entrance slot and the delivery-opening or openings.

The above and other objects and advantages of our invention will become apparent from a detailed description of the accompanying drawings which form part of this specification and in which—

Figure 1 represents a front view of the machine embodying the several features of my invention, the front plate or wall of the casing being omitted so as to expose the parts within; Fig. 2 is a longitudinal cross-sectional view on line II—II of Fig. 1, the hinged section of the casing being shown in open position; Fig. 3 is an interior face view of the hinged section of my machine, showing the coin-carrier and the slot-closer; Fig. 4 is a longitudinal cross-sectional view on line IV—IV of Fig. 3; Fig. 5 is a top plan view of Fig. 3; Fig. 6 is a plan view in cross-section taken on line VI—VI of Fig. 3; Fig. 7 is a fragmentary view in elevation of one of the side walls of the casing showing how the ejected package is delivered through the lateral delivery-opening provided in the casing; Fig. 8 is a cross-sectional view taken on line VIII—VIII of Fig. 7; Fig. 9 is a view similar to Fig. 1 (the upper portion of the casing being broken away), showing the coin-carrier in the act of ejecting the lowermost package from one of the magazines; Fig. 10 is a longitudinal cross-sectional view on line X—X of Fig. 9; Fig. 11 is an interior face view of a portion of the hinged section of the casing, showing the coin-carrier in full lines at the limit of its movement to one side of its normal or central position and in dotted lines at the limit of its movement in the other direction; Fig. 12 shows a side view of the coin-carrier and the movable coin-retaining platform mounted thereon; Fig. 13 shows a top plan view of Fig. 11; and Fig. 14 is a plan view of the coin-supporting plate arranged underneath the coin-carrier for supporting the coin and also for preventing return movement of the carrier unless its forward or operating movement is completed.

The various parts of our new form of machine are housed within a casing indicated as a whole by C, which is preferably constructed of some suitable metal and is given on the outside a finished and attractive appearance.

In view of the simplicity of the operating mechanism within the casing, the latter may be made of small dimensions, so that when the machine is attached to the back of a theater chair, it will not prove an obstruction to the passage of persons through the aisles between the rows of chairs.

The casing C is shown as consisting of a flat section 1 and a box-like section 2. In the particular embodiment illustrated, the flat section forms the back plate of the casing and is adapted to be secured to a suitable support 3, which may for instance be the back of a theater chair. The two sections are removably or separably connected together in any suitable way, as for instance by a hinge 4 which allows the box-like section to be swung downwardly into open position, thereby exposing the interior of the casing for ready access to all the parts. The hinged section 2 comprises the top panel 5, the bottom panel 6, the front plate or panel 7 and the two side plates or panels 8 and 9. The back plate or stationary section 1 of the casing is provided with a forwardly-extending top flange 10 and forwardly-extending side flanges 11 and 12, as best shown in Figs. 1 and 2. When the hinged section 2 is in closed position, the horizontally projecting flanges on the back plate 1 overlap and snugly surround the edge of the pivoted section, as shown in Fig. 1, and thus produce a tight, effective closure. The swinging section is held locked to the back plate of the casing by any suitable locking means.

For the sake of illustration, we have shown the back plate provided with a pair of recessed lugs 13 which are adapted to be engaged by the projecting ends of the locking bolts 14 of the lock L secured to the underside of the top plate 5. The lock L may be of any suitable construction, and as it forms no part of our present invention we have not deemed it necessary to illustrate and describe the details of any specific form of lock. It may be stated that the locking bolts 14 are adapted to snap automatically into engagement with the lugs 13 when the swinging section is moved into closed position. To release the lock L a key is inserted into a slot provided for that purpose near the top of the swinging section, as is done with many of the locks shown in the prior art.

To the back plate 1 of the casing are secured two magazines indicated as a whole by M and M'. These magazines are conveniently formed out of sheet metal and comprise each a back plate 15, sides 16 and front flanges 17 which project inwardly at substantially right angles to the sides. The bottom 18 of the magazines may be most conveniently formed by providing the back plate 15 with an extension which is bent forwardly and then upwardly at 19. The upwardly-bent portion 19 forms a vertical flange which engages the lower end of the upright flanges 17, whereby a compact and rigid structure is produced. The bottom 18 of each magazine is provided with a slot 20 through which the coin in the coin-carrier projects, as will be described in detail later on. Each magazine is adapted to receive the commodity desired to be vended. In the drawings the magazine M holds packages G which may be a commodity of one kind, as for instance, chewing-gum, while the magazine M' holds packages K which may be a commodity of another kind, as for instance, candy. The upright flanges 17 serve to retain the packages in the magazines even when the machine is tilted forwardly. Each magazine is provided at the lower end of its outer side with a discharge opening of sufficient size to permit the packages contained in the magazine to be laterally ejected through this opening. In Fig. 1 the lateral discharge opening for magazine M is indicated at 21, while the lateral discharge opening of the magazine M' is indicated at 22.

The ejecting mechanism comprises the coin-carrier 23 provided with a coin-slot 24, as best shown in Figs. 6 and 13. The normal position of the coin-carrier 23 is such that the coin-slot 24 is in vertical alinement with the coin chute 25 which is formed between the adjacent sides of the magazines M and M', as shown in Figs. 1 and 9. The adjacent sides of the magazines are spaced just sufficiently to provide the coin chute 25 for directing the deposited coin into the coin-slot of the coin-carrier. Any suitable means may be provided for normally holding the coin-carrier in central position. In the specific embodiment illustrated in the drawings, this means consists of a pair of dogs 26 and 27 which are pivoted at 28 and 29, respectively, to the inner face of the front plate 7. A contractile spring 30 normally holds the dogs 26 and 27 toward each other, as indicated in Fig. 1. The inward movement of the dogs is limited by the stops 31 secured to the front plate 7. At their free ends the dogs 26 and 27 engage the opposite ends of the extension 32 on the rack bar 33 which is secured to the plate 34 of the coin-carrier. When the coin-carrier is moved to one side or the other, the spring 30 allows one or the other of the dogs 26 and 27 to yield, as shown in Fig. 9, so that the coin-carrier will, upon release, be automatically moved back to normal or central position.

We would have it understood that our invention is not limited to the precise means shown and described for normally holding the coin-carrier in central position and automatically returning it to such position upon release at the end of its forward movement. Other suitable means may be provided for this purpose, although the means which we have herein set forth is very simple and effective. The teeth of the rack bar 33 are in mesh with the teeth of the rotatable pinion 35 mounted on the squared end of the stud 36 projecting inwardly from the suitable hand-operated member 37 which is for the sake of illustration shown in the form of a cylindrical knob. A screw 36$^a$ holds the pinion 35 securely on the stud 36. The knob may be readily grasped by the hand of the patron, so as to cause rotation of the pinion 35 in one direction or the other, as desired.

It will be seen from the above that we have provided an exceedingly simple driving connection between the hand-operated member 37 and the coin-carrier 23. In order to guide the motion of the coin-carrier we have provided the rack bar 33 with a pair of guide lugs 38 which extend through the transverse slot 39 in the front plate 7 and engage the outer face of the front plate above and below the slot 39. To close the slot 39 from the outside, we provide a suitable cover plate 40 which has a recess 41 for accommodating the guide lugs 38. It will be noticed that the guide lugs 38 also serve as means for supporting the coin-carrier on the front plate of the machine.

The side 8 is provided with a delivery-opening 42 in horizontal alinement with the lateral discharge opening 21 in the magazine M. Similarly, the side 9 of the casing is provided with a delivery-opening 43 in horizontal alinement with the discharge opening 22 of the magazine M'. The lateral delivery-openings 42 and 43 are of such dimensions as to permit the ready discharge therethrough of the ejected packages. In order to close the delivery-openings 42 and 43 against the outside, so as to prevent the insertion of an instrument into the machine, we provide a pair of movable locking jaws for each delivery-opening. These jaws, while normally closing the delivery-openings, are adapted to be separated by the ejected package. As the locking jaws for the two delivery-openings are identical, it will only be necessary to describe in detail the jaws associated with one of the delivery-openings—let us say, the opening 43. Referring particularly to Figs. 4, 7 and 8, it will be seen that the upper jaw 44 is provided with a pair of slots 45 which engage the studs 46 rigidly secured to the side of the casing and projecting inwardly therefrom. The upper jaw 44 normally rests by gravity in the position shown in Fig. 4, with the top of the slots 45 resting upon the lugs 46. The lower jaw 47 is provided with a pair of slots 48 in which engage the lugs 49 secured to the side of the casing and extending inwardly therefrom. A suitable spring 50 secured at one end to the stud 51 and passing at an intermediate point around the stud 52, engages with its free end the underside of the lower jaw 47 to hold the same in its upper or closed position, as shown in Fig. 4. The studs 51 and 52 extend inwardly from the side of the casing. The upper jaw 44 is provided with teeth 53, while the lower jaw is provided with teeth 54. The teeth of the jaws are staggered so as to interlock when the jaws are in closed position. This interlocking position of the jaws is best shown in Fig. 4. It will be observed that the lower edge of the upper jaw is beveled at 55, while the free edge of the lower jaw is beveled at 56. The purpose of these beveled portions is to permit ready separation of the jaws by the ejected package. Thus, in Fig. 8, the ejected package K' which is traveling in the direction indicated by the arrow, has forced the jaws apart by the outer end of the package bearing against the oppositely-inclined surfaces of the beveled portions 55 and 56.

The coin is held in the slot of the carrier 23 by the plate or shelf 57 secured to the back plate 1 in any suitable manner, as, for instance, by screws or rivets 58 passing through the rear flange 59 of the shelf into the back plate 1. Fig. 10 shows how the coin P in the coin-carrier 23 rests upon the shelf 57. As best shown in the same figure, it will be seen that the upper portion of the coin P in the coin-carrier extends beyond the underside of the lowermost packages in the magazines, so that when the coin-carrier is moved to one side or the other of its normal position, the upper portion of the deposited coin will engage the inner end of the lowermost package of one or the other magazine (dependent upon the direction in which the carrier travels), and force this package through the lateral discharge opening of the magazine and through the delivery-opening in the side of the casing. Fig. 9 shows the carrier moved part way under the magazine M', the coin P having partially ejected the lowermost package K'. In order to prevent return movement of the coin-carrier unless its forward or operative movement has been completed, the shelf 57 is provided with two sets of ratchet teeth 60 and 61. In the particular instance illustrated in the drawings, these teeth are formed by slotting the shelf 57 at 62 and 63 and then displacing the ends of the slotted portions laterally to form steps or ratchet teeth 60 and 61. The teeth 60 provide depressions at 60', while the teeth 61 provide depressions at 61'. As a result of this construction, the coin in the coin-carrier is free to ride over the teeth 60 and 61 during the forward or operative movement of the coin-carrier, but any return movement of the coin-carrier before its forward movement is completed is arrested by the coin engaging the depressions 60' or 61', as may be seen from Fig. 9. When the coin-carrier has completed its forward movement either to the right or to the left, the coin P passes off the shelf 57 and consequently drops through slot 24 of the coin-carrier into a receptacle B. The lower ends of the adjacent sides 16 of the magazines are notched as shown at 64 in Fig. 2 to allow the coin in the carrier to pass from its central or normal position under one or the other magazine.

From the above description of our new form of machine, the operation thereof will be apparent to those skilled in the art, but we may here briefly state the operation as follows: When a coin is deposited in the slot 65, it passes down the coin chute 25 into the slot 24 of the coin-carrier 23, where it is held substantially in the position illustrated in Fig. 10. In this, its central or normal position, the upper portion of the coin projects between the lower ends of the two magazines. The proper coin having been thus deposited in the machine, the patron next turns the knob 37 in one direction or the other, according as he desires a package from the magazine M or from the magazine M'. Assuming for the sake of illustration that the patron wants a package of candy K, he turns the knob in a counter-clockwise direction as far as it will go. This operation of the knob 37 rotates the pinion 35 in the same direction as indicated by the arrow in Fig. 9. The movement of the pinion 35 is communicated to the rack bar 33 by means of the toothed connection above described, so that the rack bar is moved laterally of the casing under the magazine M' until the outer end of the rack bar abuts against the side of the casing, as shown in Fig. 11. It is this contact of the rack bar 33 with the side of the casing that arrests the rotative movement of the knob 37. During the forward movement of the coin-carrier, the coin P engages at its upper portion with the inner end of the lowermost package K' and forces the same through the discharge-opening 22 and the delivery-opening 43 in the side 9 of the casing. Just before the rack bar 33 abuts against the side of the casing, the coin P in the carrier passes beyond the shelf 57 and consequently drops out of the slot 24 into the coin receptacle B. The ejected package is not forced out of the machine altogether so as to fall through the delivery-opening 43, but is ejected from the magazine sufficiently to protrude through the delivery opening in the casing, so that the patron may grasp the protruding end of the ejected package and extract the same from the machine. Upon extraction of the package, the remaining packages in the magazine fall down by gravity; so that the lowermost package of the remaining packages may be ejected in the manner above described by a subsequent operation of the machine. Should the patron desire a package G from the magazine M he rotates the knob 37 in a clockwise direction as far as it will go, during which movement the operation above described is repeated with respect to the lowermost package in the magazine M.

The advantages of having an ejected package retained in the casing, are obvious. If the package were ejected entirely out of the casing, the purchaser would have to be on his guard to catch the package, otherwise it would fall to the floor and the purchaser might have difficulty in finding it, as theaters are usually kept dark.

It may sometimes happen that a coin is deposited when the coin-carrier is not in its normal or central position. For instance, a person may rotate the knob 37 and then deposite a coin in the machine. In this event, the coin-carrier would not be in a position to receive the deposited coin and in order to prevent a loss of this coin to the patron, we have provided means whereby a coin deposited under these conditions is retained at the bottom of the coin chute until the coin-carrier is brought to normal position, whereupon the coin automatically drops into operative position on the carrier. From opposite sides of the coin-carrier extend the arms 66 on which is slidably mounted the coin-retaining platform indicated as a whole by R. This platform consists of a body portion 67 from which extend forwardly the arms 68. As best shown in Fig. 12, these arms are looped at their free ends to provide openings or recesses in which the arms 66 engage. In this way the coin-retaining platform R is slidably mounted on the coin-carrier. The body portion 67 of the platform R may rest upon the rear end of the coin-carrier, as shown in Figs. 6 and 13, to provide a firm support for the platform. The operation of this coin-retaining platform is a follows: Let us suppose that the coin-carrier has been moved to one side of its normal or central position, as shown in Fig. 11. If now a coin P' is deposited in the machine, it will fall down the coin chute 25 upon the platform R. As the coin-carrier returns to normal position, the coin P' is retained at the bottom of the coin chute by the platform R until the coin slot 24 of the coin-carrier registers with the coin chute 25, whereupon the coin automatically drops into operative position on the coin-carrier. The knob may therefore be turned in one direction or the other and the machine will eject a package from one of the magazines in the manner above described. In the broad aspect of our invention relating to the coin-retaining platform, it is not essential that the platform be movable on the coin-carrier. However, in the preferred form of our invention the platform R is movably or adjustably mounted on the coin-carrier because this arrangement enables the coin-carrier to continue its travel after the platform has abutted against the inwardly-turned flanges 69, as shown in Fig. 11. It may here be stated that besides forming a stop for the coin-retaining platform R, the flanges 69 assist in guiding the movements of the locking jaws 44 and 47, as best shown in Fig. 4. By thus permitting the coin-carrier to continue its travel even after the platform has reached the limit of its movement by abutting against the flanges 69, we are enabled to obtain a longer ejection stroke of the coin-carrier without the necessity of widening the casing. This longer ejection stroke of the coin-carrier forces the package through the casing a considerable distance, so that it may be easily grasped by the hand of the patron for extraction from the machine.

We have also provided a simple and effective means for automatically closing or obstructing the coin slot 65 when the last package has been ejected from one or the other of the two magazines. Referring particularly to Figs. 1, 3 and 4, it will be observed that an arm 70 is pivoted to the inner face of the front plate 7 by means of the stud 71. The upper end of the arm terminates in a pair of rearwardly-extending lugs 72 which are separated from each other by the slot 73. It will be seen from Fig. 3 that the slot 73 of the arm 70 is normally in register with the coin slot 65 in the top of the casing, so that under these conditions the proper coin may be freely inserted in the machine. To hold the slot-closing arm 70 in its normal position, we provide a little springblade 74, which at one end engages in the slot 75 of the arm 70. At its other end the springblade 74 is firmly secured to the stud 76 carried on the inner face of the front plate 7. In order to permit movement of the arm 70 to either side of its normal position, the arm is provided with a cut-out portion 77. The movement of the arm in either direction is limited by the walls of the opening or cut-out portion 77 striking the stud 76. At its bottom the arm 70 is provided with a pair of cam-like flanges 78. A weight or block of metal 79 rests upon the packages in each magazine and is adapted to descend by gravity in the magazine as the packages are ejected. Each of the weights or blocks 79 is provided with a pair of lugs 80 which project forwardly from the front face of the weight. Each lug has formed thereon a cam-surface 81. When the last package has been ejected from the magazine, the upper lug 80 of the block 79 engages the adjacent flange 78 of the slot-closing arm 70 and rocks the same to one side, as shown in dotted lines at 70' in Fig. 3. This movement of the arm 70 to one side of its central or normal position causes one of the lugs 72 at the upper end of the arm to obstruct the coin slot 65, as clearly shown in Fig. 5. This positively prevents the deposition of a coin in the machine when one of the magazines is empty. The object of providing two cam lugs 80 on each block 79 is to make the blocks reversible. It will be clear from Figs. 1 and 3 that no matter how the blocks 79 are inserted in the magazines, as long as the lugs project forwardly, the upper lug will always be in position to cam the arm 70 into slot-closing position when the last package has been ejected. The upright flanges 19 at the bottom of the magazines are notched or cut out at 82 to accommodate the lower lugs 80 of the blocks 79, as shown in dotted lines in Fig. 3. Where only one lug is used on the blocks, the notches 82 are of course not necessary.

The coin box or receptacle B, previously referred to, is conveniently hinged to the pin or hinge connection 4 which connects the two sections of the casing together, as already stated. The receptacle B is provided with perforated ears or lugs 83 through which the pin 4 passes. When the casing is closed, the coin receptacle B is held in an upright position by the front section. As this section is swung open, the coin receptacle B automatically tilts forwardly until the rear side thereof engages the downwardly-projecting flange 84 formed on the coin-sustaining shelf 57. This position of the coin box B is shown in Fig. 2. It will be clear that this forward tilting of the box or receptacle B renders easy access to the contents thereof. The front wall of the coin receptacle B is cut away at 85 so as not to interfere with the operating parts of the ejecting mechanism.

Owing to an official requirement for division, the claims in this case include some part or feature of applicants' coin-controlled ejecting mechanism, or some part connected or associated therewith. In a co-pending divisional application, Serial No. 736,934, filed December 16, 1912, the claims are not limited to any part or feature connected or associated with the coin-controlled ejecting mechanism, but include this mechanism broadly as an ejecting or delivery mechanism.

While we have herein shown and described in detail one specific embodiment of the various features which characterize our invention, we would have it understood that we do not wish to be limited to such details, since changes and modifications may be made by those skilled in the art without departing from the scope of the invention as defined in the appended claims. It is furthermore apparent that certain features of our invention may be embodied in a machine without the presence of certain other features.

Having thus described our invention what we claim as new and desire to secure by Letters Patent of the United States is:

1. In a coin-controlled vending machine, a casing having two magazines arranged side by side, said magazines having each a lateral discharge opening at its lower outer end, a coin-carrier mounted mid-way between said magazines and freely operable in either direction from its coin-receiving position to carry the deposited coin into ejecting engagement with the lowermost package in either magazine, a rotatable knob mounted on the outside of said casing at the front wall thereof, and an operative connection between said knob and said coin-carrier for manually operating said coin-carrier in one direction or the other to cause delivery from the desired magazine.

2. In a coin-operated vending machine, the combination of two magazines arranged side by side, a coin-carrier arranged beneath said magazines and normally held in a position midway of said magazines to receive the deposited coin, said coin-carrier being at all times freely movable in opposite directions from its central position, teeth provided on said carrier, a rotatable pinion permanently in mesh with said teeth, and means for rotating said pinion in either direction to move said carrier transversely of the machine in either direction from its normal position to carry the coin into ejecting engagement with the lowermost package in one or the other magazine.

3. In a coin-operated vending machine, the combination of a casing provided with two magazines arranged side by side, a coin-carrier arranged beneath said magazines and normally held in a position mid-way thereof to receive the deposited coin, said coin-carrier being at all times freely movable in opposite directions from its central position, a rotatable member mounted outside of said casing in the front wall thereof and freely rotatable in either direction, and an operative connection between said member and said coin-carrier for moving the latter transversely of the machine in either direction from its normal position.

4. In a coin-operated vending machine, the combination of a casing provided with two magazines arranged side by side, a coin-carrier arranged beneath said magazines and normally held in a position midway thereof to receive the deposited coin, said coin-carrier being at all times freely movable in opposite directions from its central position and adapted to carry the deposited coin into ejecting engagement with the lowermost package in either magazine, a rotatable member mounted outside of said casing in the front wall thereof and freely rotatable in either direction, and a rack-and-pinion connection between said member and said coin-carrier for moving the latter transversely of the machine in either direction from its normal position.

5. In a coin-operated vending machine, the combination of two magazines arranged side by side, a single coin-carrier arranged beneath said magazines and normally held in a position to receive the deposited coin, a manually rotatable member for moving said coin-carrier transversely of the machine in either direction from its normal position to carry the coin into ejecting engagement with the lowermost package in either magazine, and means to prevent return of the carrier prior to completion of its forward movement.

6. In a coin-operated vending machine, the combination of a casing provided with two magazines arranged side by side, a coin-carrier arranged beneath said magazines normally in a position to receive the deposited coin, a rotatable member mounted outside of said casing in the front wall thereof and freely rotatable in either direction, and an operative connection between said member and said coin-carrier for moving the latter transversely of the machine in either direction from its normal position, and means to prevent return of the carrier prior to completion of its forward movement.

7. In a coin-controlled vending machine, the combination of a casing provided with two magazines arranged side by side, a common coin-carrier arranged beneath said magazines, spring means for normally holding said coin-carrier in a position midway of said magazines to receive the deposited coin, a rotatable member projecting outside of said casing and freely rotatable in either direction, and an operative connection between said member and said coin-carrier for moving the latter transversely of the machine in either direction from its normal position to carry the coin into ejecting engagement with the lowermost package in either magazine.

8. In a coin-operated vending machine provided with a coin chute, the combination of a coin-carrier held normally to receive the coin from said chute, means for operating said coin-carrier, and means adjustably mounted on said coin-carrier to hold a deposited coin at the bottom of the coin chute when the carrier is out of normal position, said holding means permitting the coin to drop automatically into operative position on the carrier when the latter reaches normal position.

9. In a coin-operated vending machine, the combination of a movable coin-carrier having a slot for receiving a deposited coin when the carrier is in normal position, and a platform slidably mounted on said coin-carrier to support the deposited coin when the carrier is out of normal position, said platform permitting the coin to drop automatically into operative position on the carrier when the latter reaches normal position.

10. In a coin-operated vending machine, a casing having its front plate hinged to the back plate, coin-operated mechanism for causing ejection of the vendible articles, and a coin-receptacle pivotally mounted below said mechanism to receive the coins therefrom, said receptacle being held in coin-receiving position by the closed front plate and adapted to automatically tilt forwardly when the front plate is swung open, whereby ready access may be had to the contents of the receptacle.

11. In a coin-operated vending machine, the combination of a casing having a hinged front wall, a magazine and a coin chute secured to the back of said casing, and a coin-carrier slidably mounted on the front wall of said casing to receive the coin from the chute and cause ejection of the packages from said magazine.

12. In a coin-operated vending machine, the combination of a casing having a hinged front wall, a magazine and coin chute secured to the back of said casing, a coin-carrier slidably mounted on said front wall to receive the coin from the chute and cause ejection of the packages from said magazine, and a rotatable member mounted outside of said casing at the front thereof and operatively connected with said carrier.

13. In a coin-operated vending machine, the combination of a casing, a magazine and coin chute secured to the back of said casing, a transversely movable coin-carrier mounted on the front wall of said casing to receive the coin from the chute and cause ejection of the packages from said magazine, a rotatable member mounted outside of said casing at the front thereof, and a rack-and-pinion connection between said carrier and said rotatable member.

14. In a coin-operated vending machine, the combination of a casing having its front plate pivoted to the back plate, a magazine and a coin chute secured to said back plate, a transversely movable coin-carrier operatively mounted on the front plate of said casing to receive the coin from the chute and cause ejection of the packages from said magazine, and a coin receptacle mounted on the back plate below said coin-carrier.

15. In a coin-operated vending machine, a casing having its front plate hinged to the lower end of the back plate, coin-operated mechanism for causing ejection of the vendible articles, and a coin-receptacle mounted on the hinge-axis of said plates to receive the coins from said mechanism, said receptacle being held in coin-receiving position by the closed front plate and adapted to automatically tilt forwardly when the front plate is swung open, whereby ready access may be had to the contents of the receptacle.

16. In a coin-operated vending machine, a casing having two magazines arranged side by side, a common slidable coin-carrier arranged between said magazines and normally held in a position midway thereof to receive the deposited coin, said coin-carrier being at all times freely slidable in opposite directions from its normal position, and manually operable means mounted on the front plate of said casing for shifting said coin-carrier transversely of the machine in either direction from its normal position to cause lateral ejection of the lowermost package in either magazine.

17. In a coin-operated vending machine, the combination of a casing provided with a pair of magazines and a coin-chute, a coin-carrier arranged normally midway of said magazines beneath the same to receive the coin from said chute and carry the same into ejecting engagement with the lowermost package in either magazine, a rotatable member mounted outside of said casing at the front thereof, a pinion connected with said member, and teeth on said carrier in mesh with said pinion, said member being freely rotatable in either direction.

18. In a coin-operated vending machine, a casing consisting of a box-like section and a flat section separably connected together to afford ready access to the interior of the casing, said box-like section having a coin-slot and a delivery opening in its outer wall, a pair of spaced members secured to said flat section to form a magazine for the vendible articles, one of said members having a discharge opening arranged to register with said delivery opening when the sections are in closed position, a third member projecting from said flat section in close parallel relation to the other of said members to form therewith a coin-chute adapted to register with said coin-slot when the sections are in closed position, and manually operable mechanism for ejecting the packages from said magazine through the medium of the deposited coin.

19. In a coin-operated vending machine, a casing consisting of a box-like section and a flat section separably connected together to afford ready access to the interior of the casing, said box-like section having a coin-slot and a delivery opening in its outer wall, a pair of spaced members secured to said flat section to form a magazine for the vendible articles, one of said members having a discharge opening arranged to register with said delivery opening when the sections are in closed position, a third member projecting from said flat section in close parallel relation to the other of said member to form therewith a coin-chute adapted to register with said coin-slot when the sections are in closed position, and manually operable mechanism having a slot normally positioned beneath said coin-chute to receive the deposited coin and carry the same transversely of said casing into ejecting engagement with the lowermost package in said magazine.

20. In a coin-operated vending machine, a casing consisting of a box-like section and a flat section separably connected together to afford ready access to the interior of the casing, said box-like section having a coin-slot and a delivery opening in its outer wall a pair of spaced members secured to said flat section to form a magazine for the vendible articles, one of said members having a discharge opening arranged to register with said delivery opening when the sections are in closed position, a third member projecting from said flat section in close parallel relation to the other of said members to form therewith a coin-chute adapted to register with said coin-slot when the sections are in closed position, ejecting mechanism carried by said box-like section and having a slot normally positioned beneath said coin-chute to receive the deposited coin and carry the same transversely of said casing into ejecting engagement with the lowermost package in said magazine, and means projecting out of said box-like section to operate said mechanism.

21. In a coin-operated vending machine, a casing consisting of a box-like section and a flat section separably connected together to afford ready access to the interior of the casing, said box-like section having a coin-slot and a delivery opening in its outer wall, a pair of spaced members secured to said flat section to form a magazine for the vendible articles, one of said members having a discharge opening arranged to register with said delivery opening when the sections are in closed position, a third member projecting from said flat section in close parallel relation to the other of said members to form therewith a coin-chute adapted to register with said coin-slot when the sections are in closed position, a pivoted arm carried by said box-like section to close or obstruct said coin-slot when in operated position, said arm being normally held in inoperative position, a weight in said magazine for automatically retaining said arm in operated or slot-closing position, and manually operable mechanism having a slot normally positioned beneath said coin-chute to receive the deposited coin and carry the same transversely of said casing into ejecting engagement with the lowermost package in said magazine.

22. In a coin-operated vending machine, a casing consisting of a box-like section and a flat section separably connected together to afford ready access to the interior of the casing, said box-like section having a coin-slot and a delivery opening in its outer wall, a magazine and a coin-chute secured to said flat section, said magazine having a discharge opening to register with said delivery opening when the sections are assembled, said coin-chute being in alinement with said coin-slot when the sections are assembled, ejecting mechanism mounted on the inner face of said box-like section and having a coin-receiving slot normally underlying said coin-chute when the sections are assembled, and means for operating said mechanism to carry the deposited coin into ejecting engagement with the lowermost package in said magazine.

23. In a coin-operated vending machine, a casing consisting of a box-like section and a flat section separably connected together to afford ready access to the interior of the casing, said box-like section having a delivery opening in one of its outer side walls, a magazine within said casing for containing the vendible articles in a vertical stack, said magazine having a discharge opening to register with said delivery opening, ejecting mechanism mounted within said box-like section and having a coin-receiving slot normally in position to receive the deposited coin, and a pivoted hand-operable member for operating said mechanism to carry the deposited coin into ejecting engagement with the lowermost package in said magazine.

24. In a coin-operated vending machine, a casing consisting of a box-like section and a flat section separably connected together to afford ready access to the interior of the casing, said box-like section having a coin-slot and a delivery opening in its outer wall, a pair of spaced members secured to said flat section to form a magazine for the vendible articles, one of said members having a discharge opening arranged to register with said delivery opening when the sections are in closed position, a third member projecting from said flat section in close parallel relation to the other of said members to form therewith a coin-chute adapted to register with said coin-slot when the sections are in closed position, manually operable mechanism to receive the deposited coin and carry the same against the lowermost package in said magazine, and means for retaining the ejected package in the casing with its end projecting out of said delivery opening after action of the coin upon the package.

25. In a coin-operated vending machine, a casing consisting of a box-like section and a flat section separably connected together to afford ready access to the interior of the casing, said box-like section having a coin-slot and a delivery opening in its outer wall, a pair of spaced members secured to said flat section to form a magazine for the vendible articles, one of said members having a discharge opening arranged to register with said delivery opening when the sections are in closed position, a third member projecting from said flat section in close parallel relation to the other of said members to form therewith a coin-chute adapted to register with said coin-slot when the sections are in closed position, ejecting mechanism carried by said box-like section and having a slot normally positioned beneath said coin-chute to receive the deposited coin and carry the same transversely of said casing into ejecting engagement with the lowermost package in said magazine, means projecting out of said box-like section to operate said mechanism, and means for retaining the ejected package in the casing with its end projecting out of said delivery opening after action of the coin upon the package.

26. In a coin-operated vending machine, a casing consisting of a box-like section and a flat section separably connected together to afford ready access to the interior of the casing, a magazine and a coin-chute secured to said flat section, and a coin-carrier operatively mounted on the main wall of said box-like section to receive the coin from said chute and carry the same against the packages in said magazine.

27. In a coin-operated vending machine, a casing consisting of a shallow box-like section and a flat section separably connected together to afford ready access to the interior of the casing, said box-like section having a coin-slot on top and a delivery opening in one of its side walls, a magazine and a coin-chute within said casing, said magazine having a lateral discharge opening at its lower end in alinement with said delivery opening, said coin-chute being arranged to register with said coin-slot, mechanism movable transversely of said casing to carry the deposited coin against the lowermost package in said magazine, and means for retaining the ejected package in the casing with its end projecting out of said delivery opening after action of the coin upon the package.

28. In a coin-operated vending machine, a casing provided with a coin-slot in its outer wall and with a delivery opening in one of its outer side walls, a magazine within said casing and having a discharge opening in register with said delivery opening, mechanism to receive the deposited coin and carry the same against the lowermost package in said magazine, a rotatable member mounted on the front wall of said casing for operating said mechanism, and means within said casing for retaining the ejected package in the casing with its ends projecting out of said delivery opening after action of the coin upon the package.

29. In a coin-operated vending machine, a casing consisting of a box-like section and a flat section separably connected together to afford ready access to the interior of the casing, said box-like section having a delivery opening in one of its outer side walls, a magazine within said casing for containing the vendible articles in a vertical stack, said magazine having a discharge opening to register with said delivery opening, ejecting mechanism mounted within said box-like section and having a coin-receiving slot normally in position to receive the deposited coin, and a rotatable member mounted on the front wall of said casing for operating said mechanism to carry the deposited coin into ejecting engagement with the lowermost package in said magazine.

30. In a coin-operated vending machine, the combination of a casing consisting of a front section and a rear section separably connected together, a magazine and a coin-chute within said casing, mechanism adapted to receive the coin from said chute and cause ejection of the packages from said magazine, and a coin-receptacle pivotally mounted on said rear section so as to rest against the closed front section and automatically tilt forwardly when the front section is opened, whereby ready access may be had to the contents of the receptacle.

31. In a coin-operated vending machine, a closed casing having a removable front wall, a magazine and a coin-chute within said casing, movable mechanism for receiving the coin from said chute to cause ejection of the articles from said magazine, a fixed member for supporting the coin in operative position on said mechanism, a pivoted coin-receptacle adapted to tilt forwardly when the casing is opened, and means on said member for limiting the forward movement of said receptacle.

32. In a coin-controlled vending machine, a casing consisting of a pair of separable sections, and a coin-receptacle pivotally mounted within said casing and so arranged as to be held in upright position when the sections are closed, but to tilt forwardly when the sections are opened.

33. In a coin-operated vending machine, a closed shallow casing provided with a magazine for the vendible articles, a rack bar mounted to move in close proximity to the inner surface of the front wall of said casing, a pinion pivoted in said front wall to mesh with said rack bar, a rotatable member mounted on the outside of said front wall to operate said pinion and thereby actuate said rack bar transversely of the casing, and a coin-carrier connected to said rack bar to cause ejection of the articles from said magazine through the medium of the deposited coin.

34. In a coin-operated vending machine, a closed shallow casing provided with a magazine for the vendible articles, a rack bar mounted to move in close proximity to the inner surface of the front wall of said casing, a pinion pivoted in said front wall to mesh with said rack bar, a rotatable member mounted on the outside of said front wall to operate said pinion and thereby actuate said rack bar transversely of the casing, and a coin-carrier connected to said rack bar and provided with a coin-slot arranged at right angles to the plane of the casing to carry the coin transversely of the casing against the articles in said magazine.

35. In a coin-operated vending machine, a closed shallow casing having a horizontal slot in the front wall thereof, a movable rack bar provided with means extending through said slot to support and guide said rack bar in its movements, a cover plate for said slot on the outside of said casing, a pinion mounted in said front wall to engage said rack bar, a rotatable member mounted on the outside of said front wall to operate said pinion and thereby actuate said rack bar transversely of said casing, a magazine secured within said casing, and a coin-carrier extending at right angles from said rack bar to carry the deposited coin transversely of said casing against the articles in said magazine.

36. In a coin-operated vending machine, a closed casing having two magazines arranged side by side, a single coin-carrier arranged to operate below said magazines to carry the coin against the articles therein, an extension on said coin-carrier, a pair of spring-actuated dogs adapted to engage said extension upon each side thereof to hold said coin-carrier normally in a position midway of said magazines and to automatically return the same to normal position when released, a manually operable member on the outside of said casing, and connections between said member and said coin-carrier to operate the latter transversely of said casing in either direction from its normal position to cause ejection of the articles in either magazine.

37. In a coin-operated vending machine, a closed shallow casing provided with a pair of magazines for the vendible articles, a rack bar mounted to move in close proximity to the inner surface of the front wall of said casing, an extension on said rack bar, a pair of spring-actuated dogs pivoted in said front wall and adapted to engage said extension on either side thereof to hold said rack bar normally in a position midway of said magazines, a pinion pivoted in said front wall to mesh with said rack bar, a rotatable member mounted on the outside of said front wall to operate said pinion and thereby actuate said rack bar transversely of the casing, and a coin-carrier connected to said rack bar to carry the coin against the packages in either magazine.

In witness whereof, we hereunto subscribe our names this 24th day of November, A. D. 1911.

JAMES W. PATTERSON.
JOHN A. WEBSTER.

Witnesses:
Jos. ROBINSON,
A. J. SWING.

Copies of this patent may be obtained for five cents each, by addressing the "Commissioner of Patents, Washington, D. C."